United States Patent

Chambers

[11] B 3,983,972
[45] Oct. 5, 1976

[54] FRICTION DISC APPARATUS

[75] Inventor: Warren D. Chambers, South Bend, Ind.

[73] Assignee: The Bendix Corporation, South Bend, Ind.

[22] Filed: Mar. 27, 1975

[21] Appl. No.: 562,698

[44] Published under the second Trial Voluntary Protest Program on January 13, 1976 as document No. B 562,698.

[52] U.S. Cl. ............... 188/218 XL; 188/73.2; 188/251 A; 192/70.16; 192/70.20; 192/107 R
[51] Int. Cl.[2] ............................... F16D 65/12
[58] Field of Search ......... 188/218 XL, 71.1, 71.5, 188/73.1, 73.2, 251 A; 192/107 R, 107 M, 107 C, 70.20, 70.19, 70.16, 67 R

[56] References Cited
UNITED STATES PATENTS

| | | | |
|---|---|---|---|
| 2,989,153 | 6/1961 | Boulet | 188/218 XL |
| 3,465,860 | 9/1969 | Gingery | 192/70.16 |
| 3,473,637 | 10/1969 | Rutt | 192/107 R |
| 3,478,850 | 11/1969 | Abu-Akeel | 192/107 R X |
| 3,650,357 | 3/1972 | Nelson et al. | 188/71.5 |
| 3,747,712 | 7/1973 | Stout | 188/73.2 |
| 3,891,066 | 6/1975 | Anderson | 188/218 XL X |
| 3,892,293 | 7/1975 | Dowell | 188/73.2 X |

FOREIGN PATENTS OR APPLICATIONS

| | | | |
|---|---|---|---|
| 1,140,969 | 8/1957 | France | 188/218 XL |

Primary Examiner—Trygve M. Blix
Assistant Examiner—Paul E. Sauberer
Attorney, Agent, or Firm—William N. Antonis

[57] ABSTRACT

A rotatable brake or clutch friction disc formed of a material having characteristic strength weakness in tension and shear modes and provided with an annular metal force transmitting member interposed between the disc and fixed or rotatable portions of the brake or clutch. The annular metal force transmitting member has a plurality of circumferentially spaced apart radially extending key engaging slots or slot engaging keys. The annular metal force transmitting member may be provided with opposite radially extending annular metal shields which slidably engage similar shields on adjacent discs to provide a barrier tending to minimize air flow to and thus oxidation of a heated friction disc.

13 Claims, 5 Drawing Figures

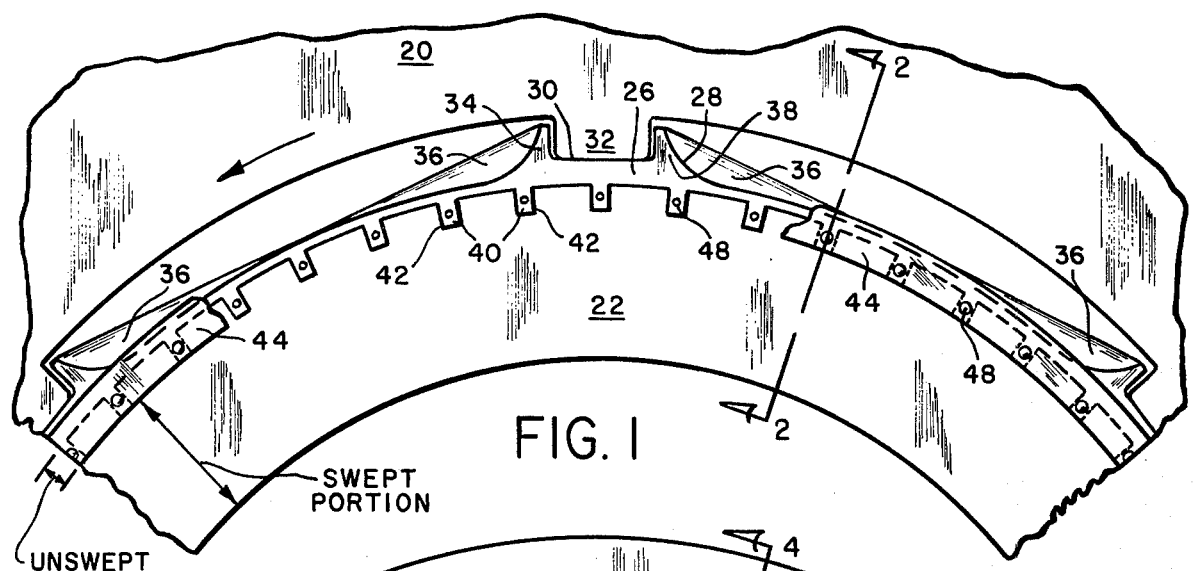
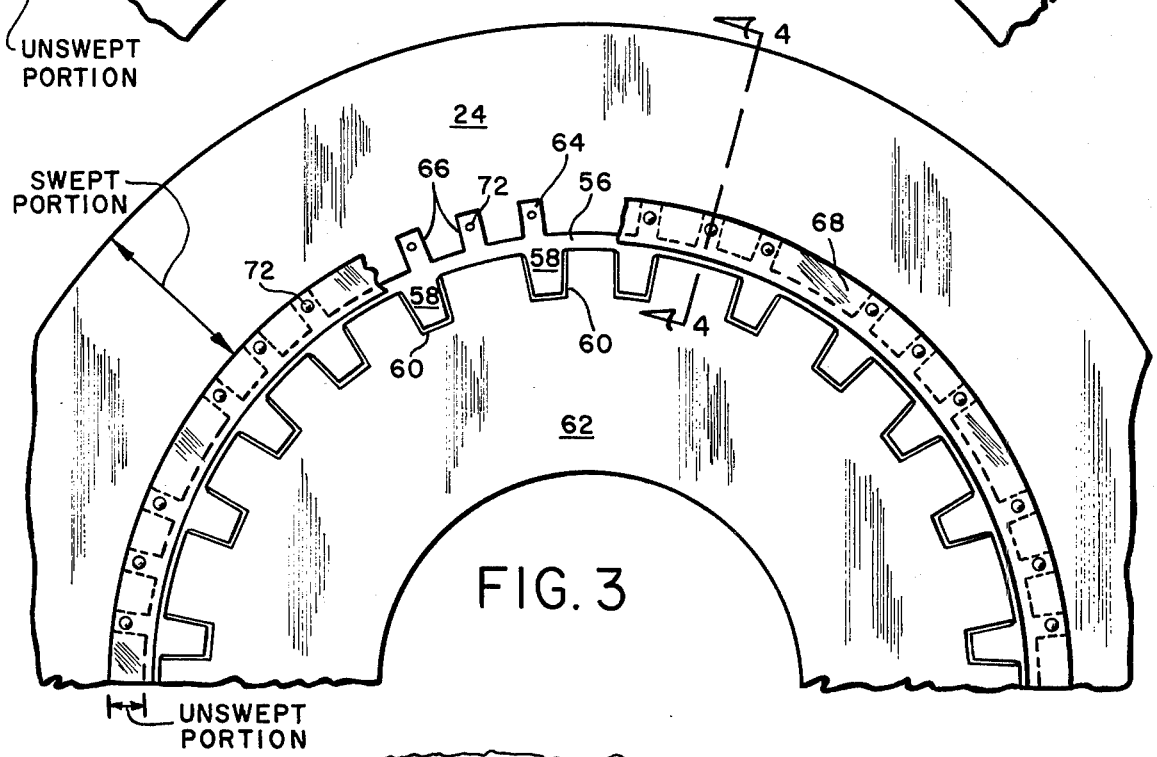
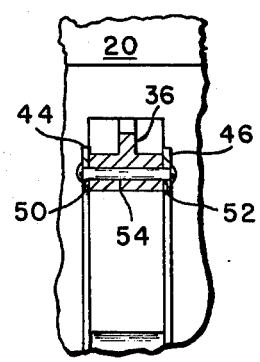
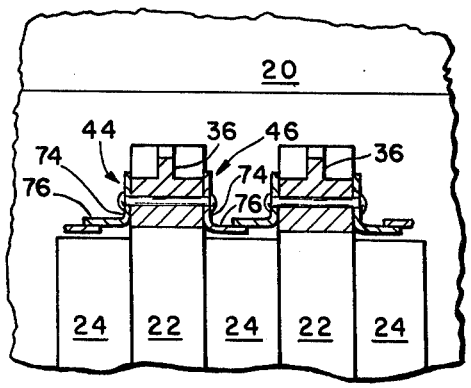
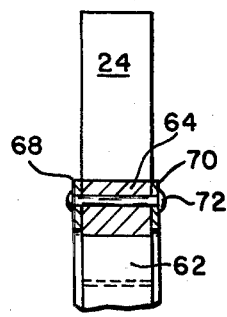

FRICTION DISC APPARATUS

BACKGROUND OF THE INVENTION

Friction discs particularly in high capacity aircraft disc brakes are subjected to extremely large heat loads as a result of energy transformation during the braking process causing the operating temperature of the friction discs to approach or exceed dangerously high temperatures. In the past, an entire friction disc or, at least, a significant portion thereof has been made of steel which cannot operate under the maximum brake temperatures reached without undesirable structural distortion and/or failure.

Relatively recent developments in aircraft high capacity disc brakes have led to the use of carbon or carbon based material for friction disc fabrication which material has the capability of withstanding much higher operating temperatures than steel without similar structural deterioration. However, a disadvantage of such a carbon or carbon based friction disc is that it has a characteristic strength weakness under tension and shear modes and, under high operating temperatures, is vulnerable to oxidation of the unswept friction surfaces thereof. The oxidation of the disc produces a corresponding undesirable physical deterioration of the same.

In view of the above, it will be recognized that a carbon or carbon based friction disc should not be subject to high localized stress in a tension or shear mode and oxidation of the friction disc should be avoided to a maximum extent.

SUMMARY OF THE INVENTION

The present invention proposes an annular carbon or carbon based friction disc having a peripheral unswept or frictionally inoperative portion upon which is mounted an annular metal shield adapted to engage the friction disc in force transmitting relationship as well as provide a barrier tending to resist the passage of air to the unswept portion of the disc and thus oxidation thereof at high temperatures.

It is an object of the present invention to provide a brake or clutch friction disc formed of carbon or carbon based material and provided with an annular metal shield which tends to reduce oxidation of the unswept portion of the friction disc under heated condition and which is provided with a plurality of driving lugs engageable with the friction disc.

It is another object of the present invention to provide a carbon or carbon based friction disc having an annular metal shield engageable with a peripheral unswept portion of the disc to resist air flow to the unswept peripheral surfaces thereby minimizing oxidation thereof at a heated condition.

BRIEF DESCRIPTION OF THE DRAWINGS

FIG. 1 is a schematic representation of a portion of an annular rotor friction disc embodying the present invention for a conventional aircraft disc brake.

FIG. 2 is a section view taken on line 2—2 of FIG. 1.

FIG. 3 is a schematic representation of a portion of an annular stator friction disc embodying the present invention for a conventional aircraft disc brake.

FIG. 4 is a section view taken on line 4—4 of FIG. 3.

FIG. 5 is a schematic representation of a modified form of the present invention.

DESCRIPTION OF THE PREFERRED EMBODIMENTS

Referring to FIGS. 1 and 2, in particular, numeral 20 designates a portion of a conventional aircraft wheel adapted to house an aircraft disc brake which, in part, includes a rotatable annular rotor friction disc 22 (FIG. 1) and a non-rotatable annular stator disc 24 (FIG. 3) formed of carbon or carbon based material and adapted to be pressed into frictional engagement (FIG. 5) to resist rotation of wheel 20. It will be understood that the usual aircraft disc brake utilizes multiple friction discs in which case a plurality of rotor discs 22 and stator discs 24 are axially aligned or stacked in alternating relationship and forced axially into engagement by suitable force generating means, not shown, to produce a braking effect. Reference is made to U.S. Pat. No. 3,844,388 for an example of such a multiple disc aircraft disc brake.

The rotor friction disc 22 as shown in FIG. 2 is encircled by a force transmitting continuous metal (preferably steel) ring 26 having a plurality of circumferentially spaced apart radially outwardly extending sections 28 each of which is notched to provide a key engaging slot 30. Each slot 30 is adapted to slidably receive an elongated drive key 32 fixedly secured to the wheel 20 thereby drivably connecting the wheel 20 to the disc 22 for rotational movement of the latter and permitting axial movement of disc 22 relative to the wheel 20 to permit engagement or release of the brake. During braking of wheel rotation shown by the arrow the key 32 bears against an end wall 34 of slot 30 which end wall 34 is provided with a circumferentially extending backing rib 36 integral therewith. During braking in the opposite direction of rotation of wheel 20, the key 32 bears against end wall 38 of slot 30 which end wall 38, like end wall 34, is supported tangentially by backing rib 36 integral therewith. As shown, the rib 36 is preferably spaced midway between the axial edges of ring 26 and is continuous but of varying radial depth between end walls 34 and 38. However, if desired, a plurality of axially spaced apart circumferentially extending ribs or walls, not shown, may be substituted for the single rib 36.

The ring 26 includes a plurality of circumferentially spaced apart radially extending keys or lugs 40 which engage mating notches or slots 42 in annular disc 22. It will be noted that the number of keys or lugs 40 and associated slots 42 considerably exceeds the number of keys 32 and associated slots 30. The total torque transmitted between wheel 20 and disc 22 in stopping or slowing down rotation of wheel 20 is distributed among the relatively few keys 32 resulting in relatively high force loading on the end wall 34 or 38 depending upon direction of rotation of wheel 20. However, the strength characteristics of the steel keys 32 and end wall 34 or 38 backed by rib 36 are adequate to withstand the expected forces encountered. It is desirable to minimize the number of keys 32 used to avoid unnecessary transmission of heat from the rotor discs to the wheel via the wheel keys 32. The total torque transmitted from ring 26 to disc 22 is distributed among the numerous keys or lugs 40 such that each key or lug 40 bears a much lower proportionate share of the torque load than that of the keys 32 resulting in greatly reduced force loading on the end walls of slots 42 against which the keys 40 bear.

The ring 26 is provided with spaced apart annular metal (preferably steel) side plates 44 and 46 which are fixedly secured to ring 26 by suitable fastening means such as rivets 48 wherein each rivet 48 extends through suitable openings 50 and 52 in plates 44 and 46, respectively, as well as opening 54 in associated key 40. The rivets 48 are suitably upset to rigidly secure plates 44 and 46 against ring 26 clamped therebetween. The side plates 44 and 46 overlap adjacent surfaces of disc 22 and extend radially inwardly relative to ring 26 to cover slots 42. It will be understood that the side plates 44 and 46 are positioned radially outwardly from the swept friction surfaces of disc 22, i.e., the opposite faces thereof which are frictionally engaged by adjacent stator discs 24. In FIG. 1, it will be noted that side plate 44 is shown with a circumferential portion thereof broken away. In this manner, the ring 26 and side plates 44 and 46 serve as a shield for the radially outermost unswept portion of disc 22 which unswept portion of the carbon disc 22 has a tendency to oxidize severely under a relatively hot condition of disc 22 during braking. The oxidation of disc 22 is undesirable due to the adverse effect on the strength characteristics of the same as will be understood by those persons skilled in the art. The shielding of the unswept portion of disc 22 in the above-mentioned manner tends to produce an oxygen starved condition and corresponding reduction in oxidation of the unswept portion.

Referring to FIG. 3, a stator disc 24 is shown with a modified form of ring 26 secured thereto. Such modified form includes an annular ring 56 provided with a plurality of circumferentially spaced apart, radially inwardly extending keys or lugs 58 which mate with corresponding axially extending splines or grooves 60 formed in a fixed torque tube generally indicated by 62. A plurality of circumferentially spaced apart, radially outwardly extending keys or lugs 64 engage mating notches or slots 66 in stator disc 24.

The ring 56, like ring 26, is provided with spaced apart annular steel side plates designated by numerals 68 and 70, respectively, which side plate 68 is shown with a circumferential portion thereof broken away. The plates 68 and 70 are fixedly secured to ring 56 by suitable fastening means such as rivets 72 wherein each rivet 72 extends through suitable openings, not numbered, in plates 68 and 70 as well as associated key or lug 64 and is upset to rigidly secure plates 68 and 70 against ring 56. The side plates 68 and 70 bear against the continuous radial outermost portion of ring 56 and extend radially therefrom to cover slots 66 thereby shielding the radial innermost frictionally unswept portion of carbon stator disc 24 in the same manner and for the same reason as ring 26 and side plates 44 and 46 protect rotor disc 22.

FIG. 5 illustrates a modified form of the side plates 44 and 46 to provide protection against oxidation for the radially outermost edge portion of the stator discs 24. To that end, each of the annular side plates 44 and 46 may be formed with a radially extending annular wall 74 and an axially extending cylindrical wall 76 perpendicular to wall 74. The annular walls 74 are fixedly secured to ring 26 by rivets 48 which extend through keys 40. The cylindrical wall 76 projects axially from disc 22 and partly over the adjacent stator disc 24 concentric therewith. The wall 76 of plate 44 of one rotor disc 22 telescopes or slidably engages the oppositely extending wall 76 of plate 46 on the adjacent rotor disc 22 thereby completely covering the outer peripheral edge of stator disc 24 interposed between two adjacent rotor discs 22. It will be understood that the rotor discs 22 rotate together thereby avoiding any relative rotation of the telescoping cylindrical walls 76. The telescoping nature of cylindrical walls 76 compensates for the decreasing axial spacing between adjacent rotor discs 22 caused by wear of the frictionally engaged surfaces of the rotor and stator discs 22 and 24. It will be recognized that the extent to which the telescoping cylindrical walls of plates 44 and 46 may telescope is selected to compensate for the expected wear life of either the stator disc 24 or rotor disc 22 or cumulative wear of both.

The side plates 68 and 70 of stator disc 24 may be modified to include cylindrical walls, not shown, similar to walls 76 of FIG. 5, but extending axially over the radial inner peripheral edge of rotor discs 22 into telescoping engagement with the cylindrical walls of the next adjacent stator discs 24 to thereby shield the radial inner peripheral edge of rotor discs 22 interposed therebetween. In this manner, the radial inner peripheral edge of a rotor disc 22 may be protected against undue oxidation in the same manner as the outer peripheral edge of stator disc 24 of FIG. 5.

If desired, the ring 26 may be formed in arcuate segments, not shown, arranged in end abutting relationship to define a substantially continuous ring. The side plates 68 and 70 may be continuous or formed of arcuate segments, not shown, and suitably secured to continuous ring 26 or the arcuate segments thereof, if segmented, to establish a rigid assembly of ring 26 and side plates 68 and 70.

A further advantage of the above described annular ring 26 and side plates 44 and 46 as modified and shown in FIG. 5 is that the telescoping cylindrical walls 76 provide a shield against water, oil or debris being thrown radially inwardly to the frictionally swept areas of the rotor or stator discs. It will be understood that carbon or carbon based friction discs are adversely affected by moisture and the like such that, in an aircraft brake in particular, it is desirable to prevent entry of water to the friction surfaces of the rotor and stator discs.

I claim:

1. Friction disc apparatus particularly adapted for a brake used in retarding rotation of a wheel comprising:
   an annular carbon or carbon based friction disc having frictionally swept and unswept annular areas;
   an annular metal ring concentric with said annular friction disc and arranged contiguous to one of the two radially spaced apart peripheral edge portions thereof;
   a plurality of circumferentially spaced apart lug members formed on said ring and extending radially therefrom into engagement with a plurality of mating circumferentially spaced apart slots in said one peripheral edge portion;
   a plurality of circumferentially spaced apart force transmitting members formed on said ring and extending radially therefrom in opposition to said lug members;
   first and second axially spaced apart annular metal plate members fixedly secured to said ring and extending therefrom to overlay the major portion of said unswept annular area;
   said annular metal ring and said first and second annular plate members providing a force distributing medium for said friction disc as well as a shield to minimize oxidation of said unswept annular areas.

2. Friction disc apparatus as claimed in claim 1 wherein:
said first and second plate members are fixedly secured to said ring by a plurality of fastening members extending through said first and second plates and said lug members clamped therebetween.

3. Friction disc apparatus as claimed in claim 1 wherein:
said annular friction disc is a rotor disc connected to be driven by said wheel;
said annular metal ring encircling said rotor disc with said plurality of lug members extending radially inwardly therefrom into engagement with said mating slots of said rotor disc and said force transmitting members extending radially outwardly relative to said ring into operative engagement with said wheel.

4. Friction disc apparatus as claimed in claim 1 wherein:
said annular friction disc is a stator disc connected to a rotatably fixed brake torque tube;
said annular metal ring being surrounded by said stator disc with said plurality of lug members extending radially outwardly from said ring into engagement with said mating slots of said stator disc and said force transmitting members extending radially inwardly from said ring into operative engagement with said torque tube.

5. Friction disc apparatus as claimed in claim 1 wherein:
said annular metal ring is defined by a plurality of arcuate segments arranged in end abutting relationship.

6. Friction disc apparatus as claimed in claim 1 wherein:
said first and second annular metal plates are each defined by a plurality of arcuate segments arranged in end abutting relationship and secured together by fastening means.

7. Friction disc apparatus as claimed in claim 1 wherein:
said force transmitting members are each defined by a radially extending slot adapted to receive a key member fixedly secured to said wheel;
said slot having spaced apart end walls each of which walls is supported by at least one backing rib integral with said ring and extending circumferentially therealong.

8. Friction disc apparatus as claimed in claim 1 wherein:
said circumferentially spaced apart lug members are relatively closely spaced in comparison to the spacing of said force transmitting members.

9. Friction disc apparatus as claimed in claim 1 wherein:
said brake is provided with a plurality of said friction discs axially aligned in stacked relationship;
said first annular metal plate member of a first of said friction discs is formed with a radially extending wall portion secured to said ring associated therewith and an axially extending cylindrical wall portion projecting therefrom in radially spaced relationship to a second friction disc adjacent thereto;
said second annular metal plate member of a third friction disc is formed with a radially extending wall portion secured to said ring associated therewith and a cylindrical wall portion projecting therefrom in radially spaced relationship to said second friction disc into telescoping engagement with said cylindrical wall portion of said first annular plate member.

10. Friction disc apparatus as claimed in claim 1 wherein:
said brake is provided with a plurality of said friction discs axially aligned in stacked relationship;
said first annular metal plate member of a first of said friction discs having an axially extending cylindrical first wall portion projecting therefrom in radially spaced relationship to a second of said friction discs adjacent thereto;
said second annular plate member of a third of said friction discs having an axially extending cylindrical second wall portion projecting therefrom in radially spaced relationship to said second friction disc and slidably engaging said first wall portion for telescoping movement relative thereto;
said first and second cylindrical wall portions providing a shield tending to resist air flow to the peripheral edge of said second friction disc encircled by said telescoping first and second wall portions.

11. Friction disc apparatus as claimed in claim 10 wherein:
said first and third of said friction discs are rotatable rotor discs; and
said second of said friction discs is a non-rotatable stator disc interposed between said first and third rotor discs and frictionally engageable therewith.

12. Friction disc apparatus as claimed in claim 10 wherein:
said first and third of said friction discs are non-rotatable stator discs; and
said second of said friction discs is a rotatable rotor disc.

13. Friction disc apparatus as claimed in claim 10 wherein:
said axially extending first and second cylindrical wall portions telescope in response to wear of the friction surfaces of said second friction disc.

* * * * *